Dec. 27, 1960   E. C. SEARS ET AL   2,966,539
ELECTRICALLY CONDUCTIVE PIPE JOINT AND GASKET
Filed Oct. 7, 1957   2 Sheets-Sheet 1
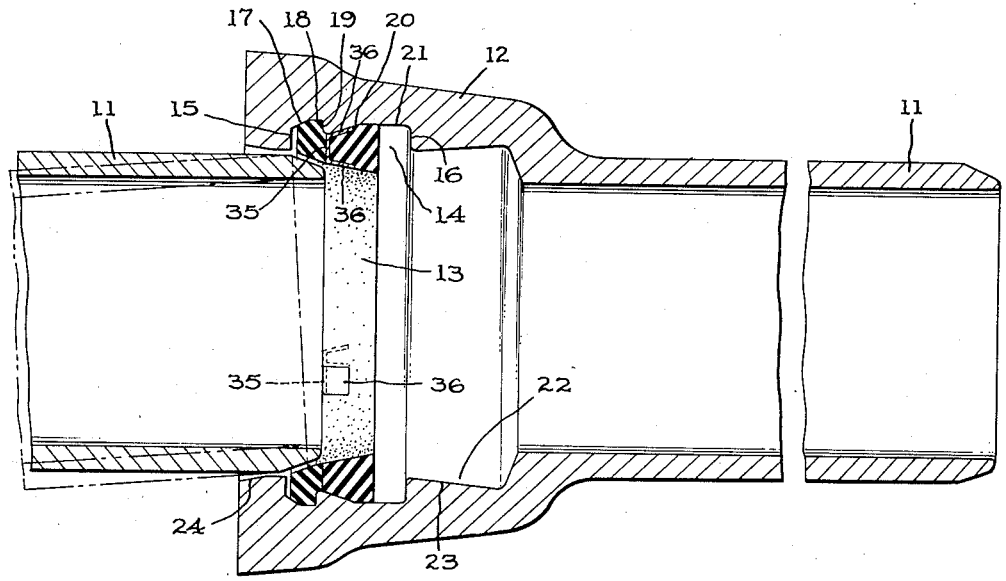
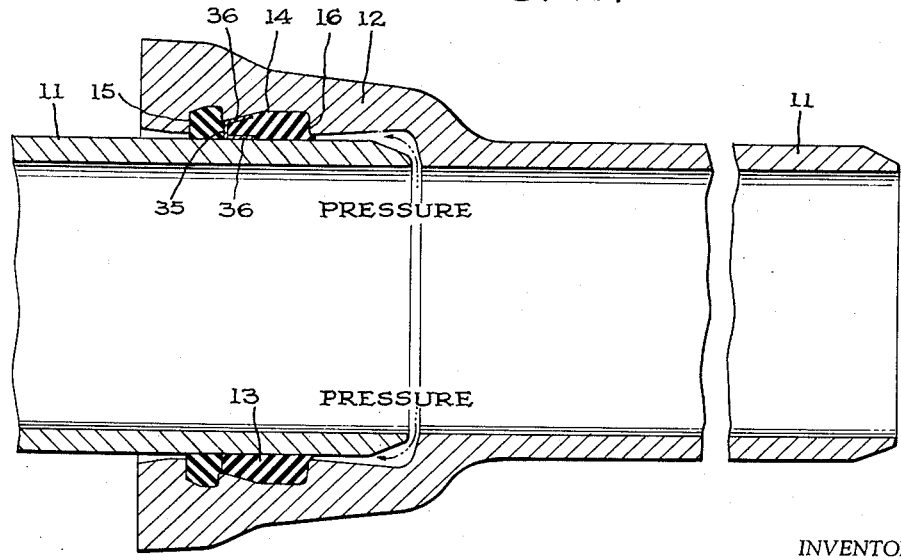
INVENTORS
EDWARD C. SEARS
WILLIAM E. SNOW
BY CHESTER E. THOMAS
Cameron, Kerkam + Sutton
ATTORNEYS Dec. 27, 1960   E. C. SEARS ET AL   2,966,539
ELECTRICALLY CONDUCTIVE PIPE JOINT AND GASKET
Filed Oct. 7, 1957                            2 Sheets-Sheet 2

INVENTORS
EDWARD C. SEARS
WILLIAM E. SNOW
CHESTER E. THOMAS
BY *Cameron, Kerkam & Sutton*
ATTORNEYS United States Patent Office 2,966,539
Patented Dec. 27, 1960

2,966,539
ELECTRICALLY CONDUCTIVE PIPE JOINT AND GASKET

Edward C. Sears, William E. Snow, and Chester E. Thomas, Birmingham, Ala., assignors to American Cast Iron Pipe Company, Birmingham, Ala., a corporation of Georgia Filed Oct. 7, 1957, Ser. No. 688,498

3 Claims. (Cl. 174—47)

This invention relates to metal pipe joints, couplings and fittings of the socket and spigot type and to gaskets for use therein, and is particularly directed to the provision of improved means for providing an electrical connection between the socketed and spigotted elements of such a joint.

In those sections of the country where water mains are subject to freezing, it has long been the practice to pass a high amperage direct current through a metal pipe line which, due to the resistance of the metal, creates heat and thaws the frozen content of the pipe. When rings or gaskets of rubber or other non-conductive material are used for sealing the joint between the socket and spigot ends of adjacent sections of such pipe, the sealing material electrically insulates said sections from one another, and it is necessary to provide additional means for electrically connecting the two elements of the joint. Heretofore, such means have customarily taken the form of a ring of lead or other readily deformable conductive material which is caulked or otherwise forced into the joint outwardly of the gasket.

The principal object of the present invention is to provide a new and improved form of electrically conductive or bonded pipe joint wherein the electrical connection between the elements of the joint is provided by the sealing gasket itself, thereby facilitating assembly of the adjacent pipe sections and minimizing the amount of material required to form the joint therebetween.

A further object of the invention is the provision of a pipe joint gasket of novel structure which serves both to seal the joint and to electrically connect or bond the socket and spigot members forming the joint.

These and other objects will appear more fully upon consideration of the detailed description of the embodiments of the invention which follows. In this connection, although three specifically different forms of pipe joints and gaskets are described and illustrated in the accompanying drawings, it is to be expressly understood that these drawings are intended for purposes of illustration only and are not to be construed as defining the limits of the invention, for which latter purpose reference should be had to the appended claims. It will also be understood that, while the drawings show joints between two sections of socket and spigot type pipe, the invention is equally applicable to couplings and other fittings which require a fluid-tight electrically conductive joint between a socketed element and cooperating spigotted element.

In the drawings, wherein like reference characters indicate like parts throughout the several views:

Fig. 1 is a sectional view through the axis of one form of pipe joint embodying the present invention showing the parts prior to assembly;

Fig. 2 is a sectional view of the joint of Fig. 1 after assembly;

Figure 3:
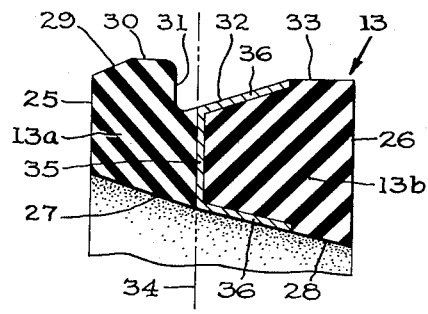
Figs. 3 and 4 are fragmentary sectional and plan views of the gasket of the joint of Figs. 1 and 2, drawn on an enlarged scale to better illustrate the means which provide the electrical connection between the socket and spigot members of the joint.
Figure 5:
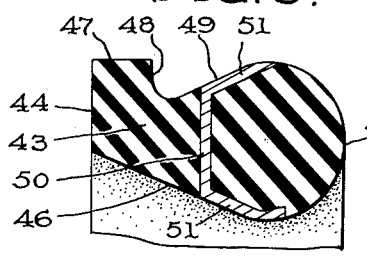
Figure 6:
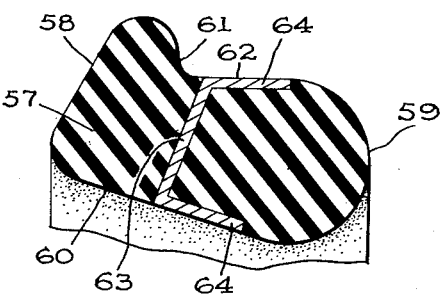
Figure 7:
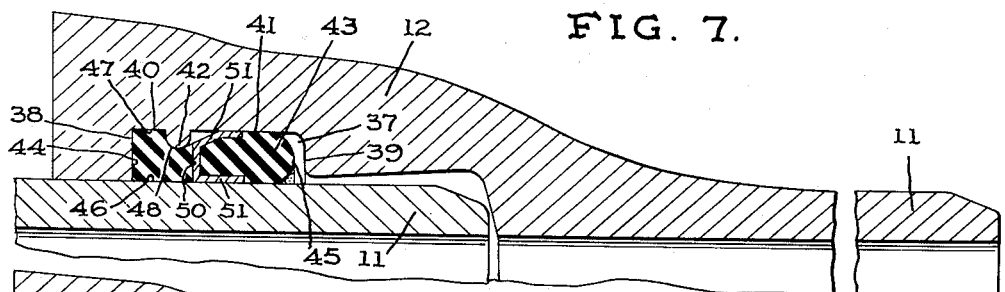
Figure 8:
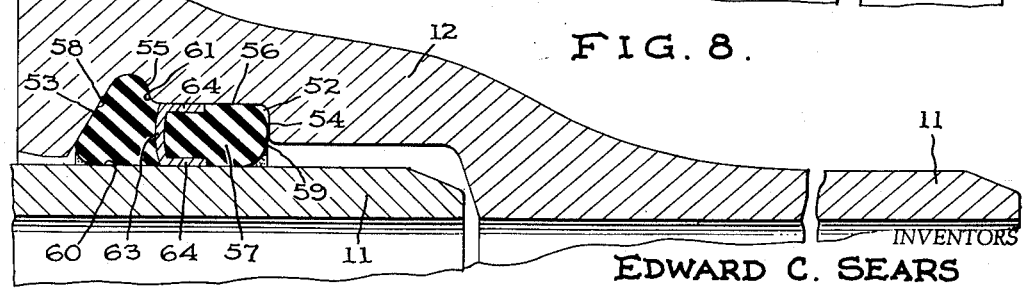

Figs. 5 and 6 are sectional views similar to Fig. 3 of modified forms of gaskets embodying the invention; and Figs. 7 and 8 are partial sectional views of assembled joints embodying the gaskets of Figs. 5 and 6, respectively.

The joint shown in Figs. 1 and 2 as exemplary of the invention comprises the spigot 11 of one section of metal pipe, the socket or bell 12 of the adjacent pipe section, and an annular gasket 13 made of any suitable compressible, non-conductive material which is housed in an annular cavity 14 in socket 12 and is adapted to seal the joint between the spigot and the socket against leakage even under maximum pressure and deflection load conditions.

In the form illustrated, the gasket-receiving cavity 14 of socket 12 is bounded by a front end wall 15 and a rear end wall 16, both of which are substantially perpendicular to the axis of the socket, and a side wall of irregular configuration which comprises a first sloped portion 17 extending rearwardly from front end wall 15 in an axially divergent direction, a portion 18 extending in a substantially axial direction rearwardly from the rear edge of first sloped portion 17, a shoulder-forming portion 19 extending in a substantially radial direction from the rear edge of axially extending portion 18, a second sloped portion 20 extending rearwardly from the inner edge of shoulder 19 in an axially divergent direction, and a portion 21 extending in a substantially axial direction between the rear edge of second sloped portion 19 and rear end wall 16. The portion of socket 12 inwardly or to the rear of cavity 14 is provided with a spigot-receiving chamber 22 having a sloped or flared wall 23, while the outer end or mouth of the socket is provided with a similarly flared wall 24.

In the joint shown in Figs. 1 and 2, the angularities of first and second sloped portions 17 and 20 of the side wall of cavity 14 with respect to the axis of socket 12 are so selected (the angularity of first sloped portion 17 preferably being greater than that of second sloped portion 20) that a double sealing action is produced which maintains the joint tight under all conditions of pipe movement and pressure. The diameter of the first axially extending portion 18 is also preferably greater than that of the second axially extending portion 21 so that a relatively deep, substantially radial shoulder is formed which insures maintenance of the gasket 13 in proper position during assembly of the joint.

Referring now to Fig. 3, wherein the gasket 13 is shown in uncompressed condition, it will be seen that the annular body of the gasket is defined by a front end wall 25 and a rear end wall 26 which are substantially perpendicular to the axis of the gasket, an inner side wall made up of a first sloped portion 27 extending rearwardly from front end wall 25 in an axially convergent direction and second sloped portion 28 which is also axially convergent but at a smaller angle than portion 27, and an outer side wall having substantially the same irregular configuration as the side wall of socket cavity 14. The outer side wall of the gasket thus comprises a first sloped portion 29 extending rearwardly from front end wall 25 in an axially divergent direction, a first axially extending portion 30 extending rearwardly from the rear edge of first sloped portion 29, a shoulder-forming portion 31 extending in a substantially radially inward direction from the rear edge of first axially extending portion 30, a second sloped portion 32 extending rearwardly from the inner edge of shoulder 31 in an axially divergent direction, and a second axially extending portion 33, the diameter of which is less than that of first axially extending portion 30. The angularities of sloped portions 29 and 32 of the outer side wall of the gasket are substantially the same as those of sloped portions 17 and 20, respectively, of the side wall of the socket cavity.

When in uncompressed condition, the width or axial dimension of gasket 13 between front end wall 25 and rear end wall 26 is less than the width of socket cavity 14 so that, when the gasket is initially inserted in the cavity as shown in Fig. 1, there will be sufficient clearances between the front and rear end walls of the gasket and the end walls of the cavity to accommodate the mass of the gasket when it is redistributed as a result of the pressures produced during assembly of the joint and when the pipe line is placed in service. On the other hand, the outside diametral dimensions of the gasket when uncompressed are slightly greater than the corresponding dimensions of cavity 14 so that the gasket will always have a compressed fit against the side wall of the cavity. The inside diameter of the uncompressed gasket is greater than the outside diameter of spigot 11 at the front edge of sloped portion 27 of the inner side wall, but becomes progressively smaller toward the rear end of the gasket until, at the rear edge of sloped portion 28, it is considerably less than the spigot diameter.

As is indicated by the crosshatching in Figs. 1, 2 and 3, the body of gasket 13 is preferably made of compressible material, such as rubber, of two different degrees of hardness, the front part 13a forwardly of shoulder 31, including the shoulder-forming portion, being harder and more resistant to compression and flow than the rear part 13b. For example, all of the gasket forwardly of the radially extending plane indicated at 34 in Fig. 3 may be made of rubber having a Shore "A" durometer hardness of about 85 to 90, while the part to the rear of plane 34 is made of rubber having a Shore "A" durometer hardness of about 50 to 65. Although the plane 34 which divides the hard and soft parts of the gasket may be coplanar with shoulder-forming portion 31 of the outer side wall of the gasket, it is preferably located slightly to the rear of the fillet at the base of the shoulder, the object being to insure that all portions of the outer wall of the gasket which contact the first sloped portion 17, axially extending portion 18 and shoulder-forming portion 19 of the side wall of socket cavity 14 are made of the relatively harder, less compressible material. If desired, the external surfaces of the gasket, particularly front end wall 25 and sloped portion 27 of the inner side wall, may be provided with a fabric reinforcement to increase the resistance to abrasion.

In order to electrically connect or bond the spigot and socket members of the joint so that an electrical current may be passed therethrough for thawing or other purposes, the gasket 13 is provided with one or more conductive bonding members embedded in the body of the gasket and adapted to make electrical contact with both spigot 11 and socket 12.

Figure 4:
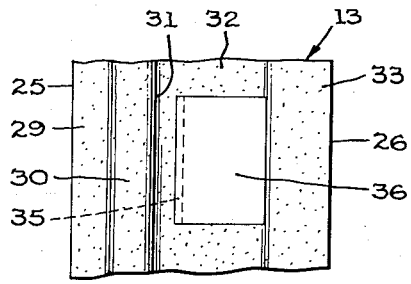

As shown best in Figs. 3 and 4, each bonding member 35 consists of a relatively thin strip of copper or other conductive material having a central portion which is embedded in and extends radially through the body of the gasket and a pair of contact forming portions 36 which extend rearwardly along portions of the inner and outer side walls of the gasket in positions such as to make electrical contact with the side wall of socket cavity 14 and the outer surface of spigot 11 when the joint is assembled. In the embodiment of the invention illustrated in Figs. 1–4, a plurality of members 35 extend through the soft part 13b of the gasket at circumferentially spaced points immediately adjacent the plane 34 at which the hard and soft parts connect, and their contact-forming portions 36 overlay parts of second sloped portion 32 of the outer side wall and second sloped portion 28 of the inner side wall of the gasket, the outer surfaces of said contact-forming portions being substantially flush with those of the gasket side walls.

It will be understood that the conductive members 35 may be embedded in or inserted into the gasket in any suitable manner, either during or after the gasket molding operation, and may be positioned at any suitable location other than that illustrated. However, when the gasket is formed of materials of two different degrees of hardness, the bonding members are preferably located in the softer part.

The number and size of bonding members 35 are so selected as to provide sufficient conductivity for the current which it is desired to pass through the joint. For example, in the case of a 6" pipe joint intended to conduct a current of from 400 to 600 amperes, three copper clips approximately 1/32" thick and 1/2" wide, spaced 120° apart circumferentially of the gasket, have been found adequate.

In assembling the joint, the gasket 13 is first seated in cavity 14 of socket 12 in the position shown in Fig. 1. The spigot 11 is then forced inwardly into the socket, contacting first the steeper sloped portion 27 and then the less steep portion 28 of the inner side wall of the gasket and compressing the gasket in a radial direction with a consequent expansion or flow of the rubber in an axial direction, particularly in the rear part 13b which is made of the relatively softer rubber. Radial compression of the gasket also brings the contact-forming portions 36 of conductive members 35 into good electrical contact with the side wall of socket cavity 14 and the outer surface of spigot 11. Abutment of the relatively harder front part 13a of the gasket against the first sloped portion 17, axially extending portion 18 and shoulder-forming portion 19 of the wall of cavity 14 provides a strong anchorage which prevents displacement of the gasket from its proper sealing position, while the forward, hard rubber part of sloped portion 27 of the inner side wall provides a tear or abrasion resistant surface effective to guide the spigot 11 into engagement with the rear, soft rubber part 13b which initially seals the joint. This construction permits even a square end spigot to be assembled in deflected position (as indicated in broken lines of Fig. 1) without injury to or dislodgment of the gasket. The angularity of sloped portion 27 enables the assembly to be made under minimum load.

When the joint has been assembled and the pipe line is placed in service, the pressure of the fluid in the pipe is exerted against rear end wall 26 of gasket 13 and produces an unusually tight seal between spigot 11 and socket 12 due to the double wedging action of the two sloped portions of the gasket against the corresponding portions of the inner wall of socket cavity 14. As indicated in Fig. 2, the internal pressure forces the soft part 13b of the gasket outwardly or to the left as viewed in the figure with a resultant stuffing box effect between second sloped portion 20 of the cavity wall and the outer surface of spigot 11. This pressure also produces a slight flow or movement of the soft part of the gasket toward the mouth of socket 12 which is in turn transmitted to the hard part 13a and causes the first sloped portion 29 of the outer side wall thereof to be more tightly wedged against first sloped portion 17 of the cavity wall. There is thus produced a double seal between the sloped portions of the outer side wall of the gasket and the corresponding portions of the inner wall of the socket cavity. When the contact-forming portions 36 of bonding members 35 overlay sloped portions of the gasket walls as in the embodiment illustrated, the tight seal resulting from the wedging action of the gasket also insures good electrical contact between the bonding members and the socketed and spigotted elements of the joint.

In the event that a deflecting load should be applied while the pipe is in service, the portions of the gasket located at the points where the deflection operates to increase the clearance between the spigot 11 and socket 12 are capable of adjusting position under the effect of the internal pressure and maintaining or reestablishing the desired tightness of seal and electrical contact in a manner similar to that in which sealing and contact are established and maintained as above described when the joint is initially assembled and placed under pressure.

Referring now to Figs. 5–8, there are shown therein two modified forms of joints and gaskets embodying the invention which are similar to the embodiment of Figs. 1–4 in their general structural characteristics, function and method of assembly, but differ therefrom primarily in the shapes of the gaskets and the gasket-receiving cavities of the socketed elements of the joints, and in the fact that the seals produced thereby are not as tight as that provided by the double wedge construction of Figs. 1–4.

In the joint illustrated in Fig. 7, the socket member 12 is provided with a gasket-receiving cavity 37 having a front end wall 38 and a rear end wall 39, both of which are substantially perpendicular to the axis of the socket, and a side wall having front and rear axially extending portions 40 and 41 separated by an annular, radially inwardly projecting, rounded ridge or shoulder 42 which is adapted to lock or anchor the gasket 43 in proper position when the joint is assembled. The gasket 43, which is shown in uncompressed form in Fig. 5, has an annular body of compressible, non-conductive material which is defined by a front end wall 44 substantially perpendicular to the axis of the gasket, a rounded rear end wall 45, a sloped inner side wall 46 extending rearwardly from front end wall 44 in an axially convergent direction, and an outer side wall made up of a portion 47 extending rearwardly from front end wall 44 in an axial direction, a shoulder-forming portion 48 extending radially inwardly from the rear edge of axially extending portion 47 and a sloped portion 49 extending rearwardly from the inner edge of shoulder 48 in an axially divergent direction.

As in the case of the previously described embodiment, the gasket 43 is provided with a plurality of circumferentially spaced conductive bonding members 50 each of which consists of a central portion which extends in a substantially radial direction through the body of the gasket at a position rearwardly of shoulder 48 and a pair of rearwardly extending contact-forming portions 51 which overlay parts of inner side wall 46 and sloped portion 49 of the outer side wall, and also extend for a short distance around the extremities of rear end wall 45. Contact-forming portions 51 are of such length and so positioned as to insure that, when the joint is assembled as shown in Fig. 7, they will be pressed into electrical contact with axially extending portion 41 of the side wall of socket cavity 14 and the outer surface of spigot 11.

Figs. 6 and 8 show another embodiment of the invention wherein the gasket-receiving cavity 52 of socket 12 of the joint is bounded by a front end wall 53 which is sloped rearwardly at a relatively steep angle in an axially divergent direction, a rear end wall 54 which is substantially perpendicular to the axis of the socket, and a side wall having a reversely curved portion 55 extending rearwardly and radially inwardly from front end wall 53 and an axially extending portion 56, the reversely curved portion 55 forming a shoulder which is adapted to maintain the gasket 57 in proper position during assembly of the joint. The gasket 57, shown in uncompressed form in Fig. 6, has an annular body of compressible, non-conductive material bounded by a front end wall 58 which is steeply sloped divergently relative to the axis of the gasket at substantially the same angle as front end wall 53 of cavity 52, a rounded rear end wall 59, a sloped inner side wall 60 extending rearwardly from front end wall 58 in an axially convergent direction, and an outer side wall having substantially the same configuration as the side wall of socket cavity 52, comprising a reversely curved, shoulder-forming portion 61 and an axially extending portion 62.

In this instance, the central portion of each electrical bonding member 63 extends through the body of the gasket in an inclined position substantially parallel to front end wall 58 when the gasket is uncompressed, while the rearwardly extending contact-forming portions 64 overlay parts of inner side wall 60 and axially extending portion 62 of the outer side wall. Assembly of the joint compresses the gasket with a resultant bending of each bonding member into the shape indicated in Fig. 8 wherein the central portion occupies a slightly bowed, substantially radial position and the two contact-forming portions 64 lie in axially extending positions in electrical contact with the axially extending portion 56 of the cavity side wall and the outer surface of spigot 11.

In the latter connection, it will be understood that in each of the gaskets embodying the invention the bonding members are sufficiently flexible to permit the contact-forming portions thereof to be bent when the gasket is compressed during assembly of the joint without weakening or breaking their connection to the embedded central portions which conduct the current through the insulating body of the gasket from one element of the joint to the other.

There is thus provided by the present invention an improved joint for socket and spigot type pipe, couplings and fittings embodying a compressible gasket of novel construction which cooperates with the gasket-receiving cavity in the socketed element to produce a sealed joint wherein the socketed and spigotted elements are electrically connected or bonded together by conductive members carried by the gasket itself. Pipe joints embodying the invention require a minimum of material and are easily and quickly assembled.

Although three specifically different joints and gaskets embodying the invention have been described and illustrated in the accompanying drawings, it will be obvious that the invention is not limited to the exact structures shown, but is capable of a variety of mechanical embodiments. For example, although a gasket made of materials having two different degrees of hardness has been found to provide an exceptionally tight seal in joints of the character disclosed in Figs. 1–4, it is apparent that a gasket of uniform hardness throughout may also be used, as in the embodiments of Figs. 5–8. It is also evident that the gasket and gasket-receiving cavity of the socketed element of the joint may take shapes other than those illustrated, and that the size, number and locations of the conductive bonding members may be varied as desired to conform to the conditions under which the gaskets are to be used. Various other changes, which will now suggest themselves to those skilled in the art, may be made in the structural details of the joint and gasket, and in the character of the materials used in making the gasket, without departing from the inventive concept. Reference is therefore to be had to the appended claims for a definition of the limits of the invention.

What is claimed is:

1. An electrically conductive water-tight joint for socket and spigot type pipe, couplings and fittings capable of passing high amperage direct current for creating heat to thaw the contents of the pipe, coupling or fitting when frozen, said joint comprising a spigotted element, a cooperating socketed element receiving said spigotted element and having an annular axially elongated gasket-receiving cavity therein, an annular axially elongated gasket of electrically non-conductive material seated in said cavity with its front end adjacent the open end of said socketed element, said gasket including a rearwardly extending compressible sealing portion having outer and inner side walls which diverge toward the rear end of the gasket and a radial thickness between said side walls which, prior to assembly of the joint, is greater than the radial clearance between the wall of said socket cavity and the outer surface of said spigotted element, whereby the outer and inner walls of said sealing portion are pressed into sealing contact with the wall of said socket cavity and the outer surface of said spigotted element, respectively, when the joint is assembled, and a plurality of circumferentially spaced electrically conductive members each consisting of a central portion embedded in and extending in a substantially radial direction through the sealing portion of said gasket, and a pair of contact-forming portions connected to the ends of said central portion and extending rearwardly and divergently therefrom away from the open end of said socketed element in overlying relationship to the divergent outer and inner side walls of said sealing portion and in electrical contact with the wall of said socket cavity and the outer surface of said spigotted element, respectively, said conductive members being capable of conducting high amperage direct current and being sufficiently flexible to permit bending of the contact-forming portions relative to the central portions thereof through angles approximating 90° without breaking the connection therebetween when the sealing portion of the gasket is compressed between the wall of said socket cavity and the outer surface of said spigotted element during assembly of the joint.

2. A joint as defined in claim 1 wherein the wall of said socket cavity includes a shoulder extending inwardly in a generally radial direction and the gasket includes a shoulder in the outer side wall thereof forwardly of the compressible sealing portion of substantially the same configuration as and abutting against the shoulder of said socket cavity to prevent displacement of the gasket rearwardly from its sealing position when the joint is assembled, and wherein said electrically conductive members extend through the sealing portion of the gasket at positions rearwardly of said shoulder.

3. A joint as defined in claim 1 wherein each of said conductive members consists of a relatively thin flat strip of copper of limited width circumferentially of the gasket capable of conducting high amperage direct current on the order of 400 to 600 amperes.

References Cited in the file of this patent

UNITED STATES PATENTS

| | | |
|---|---|---|
| 2,245,154 | McWane | June 10, 1941 |
| 2,396,848 | Haushalter | Mar. 19, 1946 |
| 2,454,567 | Pierson | Nov. 23, 1948 |
| 2,589,876 | Sesher | Mar. 18, 1952 |
| 2,674,644 | Goodloe | Apr. 6, 1954 |
| 2,885,459 | Pulsifer | May 5, 1959 |

OTHER REFERENCES

Publication: "Tyton Joint For Use On Cast-Iron Pipe," published by Underwriters Laboratories Inc., dated Oct. 29, 1956 (only page 2 of the report and pages 2 and 3 of the attached catalog relied on).